US005819826A

United States Patent [19]

Schmatjen

[11] Patent Number: 5,819,826

[45] Date of Patent: Oct. 13, 1998

[54] CHIP CUTTING KNIFE WITH SPACED DEFLECTOR RIDGES

[75] Inventor: Marc D. Schmatjen, Beaverton, Oreg.

[73] Assignee: Key Knife, Inc., Portland, Oreg.

[21] Appl. No.: 956,838

[22] Filed: Oct. 23, 1997

[51] Int. Cl.$^{6}$ ............................ B27G 13/00; B23G 13/00

[52] U.S. Cl. .......................... 144/241; 194/176; 194/218; 241/92; 241/296

[58] Field of Search ............................ 241/91, 92, 189.1, 241/278.1, 292.1, 296, 298; 144/162.1, 176, 218, 241

[56] References Cited

U.S. PATENT DOCUMENTS 4,669,516 6/1987 Carpenter et al. ...................... 144/241
5,333,659 8/1994 Carpenter et al. ...................... 144/241
5,409,047 4/1995 Jorgensen ................................ 144/176
5,649,579 7/1997 Kokko et al. ........................... 144/241

*Primary Examiner*—W. Donald Bray
*Attorney, Agent, or Firm*—Kolisch, Hartwell, Dickinson, McCormack & Heuser

[57] ABSTRACT

A double-edged replaceable knife adapted for use with chip-cutting machines of various descriptions. The knife has a pair of spaced deflector portions projecting from the front side of the knife. Between the deflector portions is a channel used in properly locating the knife on a chip-cutting machine. The deflector portions are spaced at equal distances from respective cutting edges in the knife, and provide wear surfaces fronting the movement of chip material thereacross. The deflector portions also control the shape of chips cut by the machine mounting the knife.

8 Claims, 3 Drawing Sheets

CHIP CUTTING KNIFE WITH SPACED DEFLECTOR RIDGES

BACKGROUND AND SUMMARY OF THE INVENTION

This invention relates to knives, and more particularly to knives that are replaceable and that are used when installed in the appropriate apparatus for the production of chips or wood fragments from material fed into the machine.

Exemplary of machines that may be used in the production of chips or shredded material using the replaceable knives of this invention are so-called chipper machines or chippers, used extensively in the wood products field for the production of wood chips from suitable wood material employed in the production of paper or molded products such as cartons etc. In the making of wood chips, of the type used in the production of paper, the knives in the chipper cut through the wood with the cutting edges in the knives extending transversely of the grain direction in the wood, typically at an angle which may range from 30 to 45 degrees relative to the general grain direction in the wood material being cut. Chip-cutting knives may also be employed in machines such as waferizers, which produce chips of a special nature from the wood material processed, i.e., chips which are relatively thin and commonly are referred to as wafers or flakes. Wafers usually are produced by cutting through wood material with the cuts extending along lines paralleling the grain. Thin wood chips or wafers cut from wood in this manner typically might be employed in the production of oriented strand board, or wafer board, in the lumber products industry. Still another example of apparatus for which the knives of this invention are suitable are chipper-shredder machines, where the knives are mounted on a power-rotated disc, and the knives are utilized to chop up and reduce to pulverized form material fed into the machine such as cleared brush, limbs and other wood or wood-like material.

Various types of knives, more particularly double-edged knives, have been proposed in the past for use in machines producing chips including wafers, chips for pulp manufacture, and cut-up waste residue. Prior art U.S. patents disclosing knives of this description include U.S. Pat. No. 4,047,670, U.S. Pat. No. 4,669,516 and U.S. Pat. No. 4,850,408.

A general object of this invention is to provide a new type of knife for use in chip-cutting machines, where the knife includes a deflector portion on the front side of the knife, with the position of the deflector portion with respect to a cutting edge of the knife being important in determining the type of chip cut by the knife with the knife in operative position on a machine.

Another object is to provide a novel knife which includes, as part of the knife, a deflector portion protruding from the front face of the knife serving to deflect chip material, and protect from wear, surfaces in a chipper machine adjacent the deflector.

More specifically, the invention concerns a novel construction for a double-edged knife which features a pair of deflector portions on the knife's front side, each positioned at an appropriate distance from a cutting edge associated with the deflector portion, the deflector portions producing desired physical characteristics in chips cut by the knife. The construction enables a mill operator easily to change the type of chip cut merely by changing the type of knife used in the chip-cutting machine with the selection of knife controlling the type of chip produced.

Another object is to produce a novel knife construction which provides advantages in different types of chip-cutting operations. For instance, deflector portions in a knife and their spacing with respect to cutting edges provide advantages in a chip-cutting operation where the chips are cut across the grain of the wood (as done when making chips for wood pulp), and also advantages where chips are cut with cuts parallel to the grain (as typical when cutting thin chips or wafers usable in the manufacture of wafer board).

Following the invention, it is further possible to provide a knife with a pair of deflector portions controlling the configuration of chips produced, with the knife design being such that should breakage of the knife occur while in use in a chip-cutting machine, the breakage will tend to result in a marginal extremity spaced away from a zone in the knife where the knife is clamped in the machine. This is important in limiting damage to the machine and promoting worker safety.

A further object of the invention is to provide a novel knife construction which promotes the stacking of knives in a nested position, important in obtaining ease of handling when transporting multiple knives, and in promoting mechanized or automated handling, such as indexing or loading.

BRIEF DESCRIPTION OF THE DRAWINGS

These and other objects and advantages are obtained by the invention, which is described herein below in conjunction with the accompanying drawings, wherein.

DETAILED DESCRIPTION OF THE PREFERRED EMBODIMENT

Figure 1A:
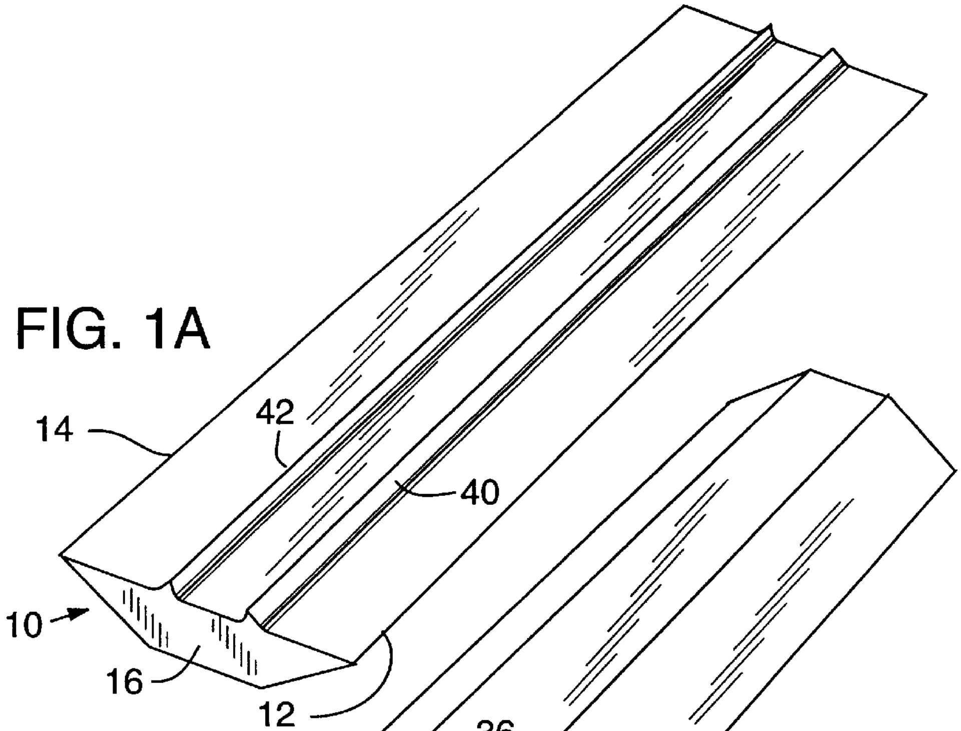
FIGS. 1A and 1B are perspective views of a knife constructed according to a preferred embodiment of the invention.
Figure 1B:
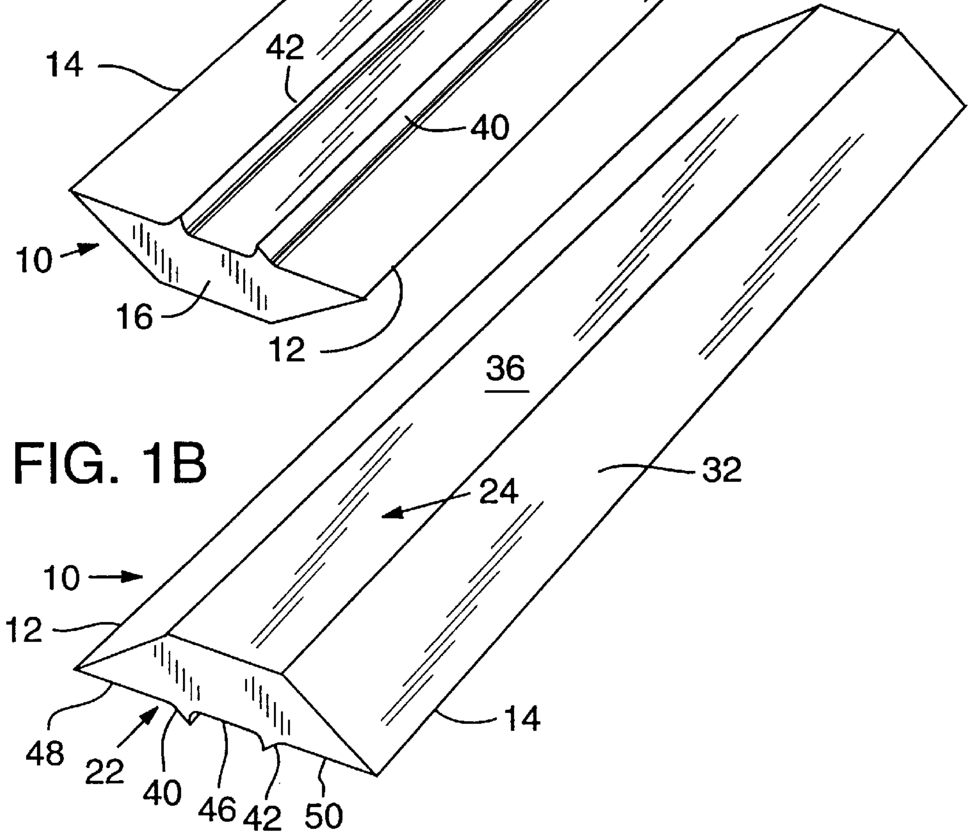
Figure 2:
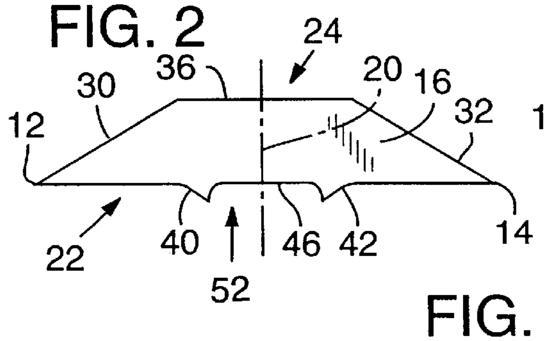
FIG. 2 is an end view of the knife shown in FIG. 1.

Referring now to the drawings, illustrated in FIGS. 1A and 1B at 10 is a double-edged knife usable in chip-cutting machines for producing chips of wood material fed into the machine. The knife includes one cutting edge 12 extending along one margin of a body 16 in the knife, and another cutting edge 14 extending along an opposite margin in the knife body. As shown in FIG. 2, the knife body is symmetrical in regions disposed on opposite sides of a mid plane 20 bisecting the knife body and extending parallel to edges 12 and 14.

Describing body 16 in more detail, the body has a front side which faces downwardly and to the left in FIG. 1B, shown at 22, and a back side 24 which faces in the opposite direction.

Back side 24 includes what is referred to herein as a back knife-edge-joining portion 30 which extends from knife edge 12, and another back knife-edge-joining portion 32 which extends from knife edge 14. Between these two back knife-edge-joining portions is what is referred to herein as a clamp-facing surface portion 36. The two back knife-edge-joining portions form obtuse angles with the surface portion 36, and in typical knife constructions, this obtuse angle might range from 135 to 160 degrees. The clamp-facing surface portion is bisected by plane 20.

The front side of the knife body features a pair of deflector portions, shown at 40 and 42 protruding from the front side of the body. These deflector portions are spaced equal distances from mid plane 20. Extending between the deflector portions, which can be thought of as elongate ridges extending parallel to the knife cutting edges, is a pressure-applying surface portion 46. Front knife-edge-joining portions 48, 50 extend inwardly on the knife body from the cutting edges. The front and back knife-edge-joining portions extending from a cutting edge in the knife body bound a marginal region in the knife. Pressure-applying surface portion 46 and clamp-facing surface portion 36 bound a central region in the knife body.

In the knife so far described, cutting edges 12 and 14 occupy a common plane referred to as a cutting edge plane. This plane is spaced laterally from clamp-facing surface portion 36. Pressure-applying surface portion 46 is also spaced laterally from surface portion 36, and this spacing is no less than, i.e., equal to or greater, the spacing of the cutting edge plane from surface portion 36. As a consequence, the region bounded by the pressure-applying surface portion and the clamp-facing surface portion, throughout its extent, has a thickness which equals or exceeds the thickness of the marginal regions of the knife body throughout the extent of these marginal regions. This type of construction minimizes the presence of thin areas of reduced thickness in mid regions of the knife body, with the result that should breakage occur in a knife body during use, breakage will occur in marginal portions of the knife body and not in a central region, which is the region being clamped. This type of breakage is important in minimizing damage to the machine holding the knife, and enhancing the safety of workers using the equipment.

Pressure-applying surface portion 46 and clamp-facing surface portion 36 are substantially perpendicular to mid plane 20 where the surfaces are bisected by this mid plane.

The front knife-edge-joining surface portions join with the surfaces of the deflector portions along a smoothly curving transition region to promote easy movement of wood chip material there over. Surfaces on the inside of the deflector portions meet over smoothly curving transition regions with pressure-applying surface portion 46. This avoids high stress regions in the knife body.

A channel is defined on the front side of the knife, given reference number 52 in FIG. 2, located between deflector portions 40, 42 and bounded along its base by surface 46. This channel is used as a key-receiving channel serving property to locate the knife in a chip-cutting machine.

Front knife-edge-joining surface portions 48, 50 may be substantially flat and may occupy a substantially common plane extending perpendicular to mid plane 20. In some instances the front knife-edge-joining surface portions may have a slight relief grind directly adjacent the cutting edges, to provide relief surfaces extending at a very slight angle with respect to the overall plane of the edge-joining surface portions, as described in U.S. Pat. No. 4,850,408. In this instance, while the surface portions are essentially planar, they may not be entirely so, by reason of the slight inclination present in the relief surfaces.

Figure 5:
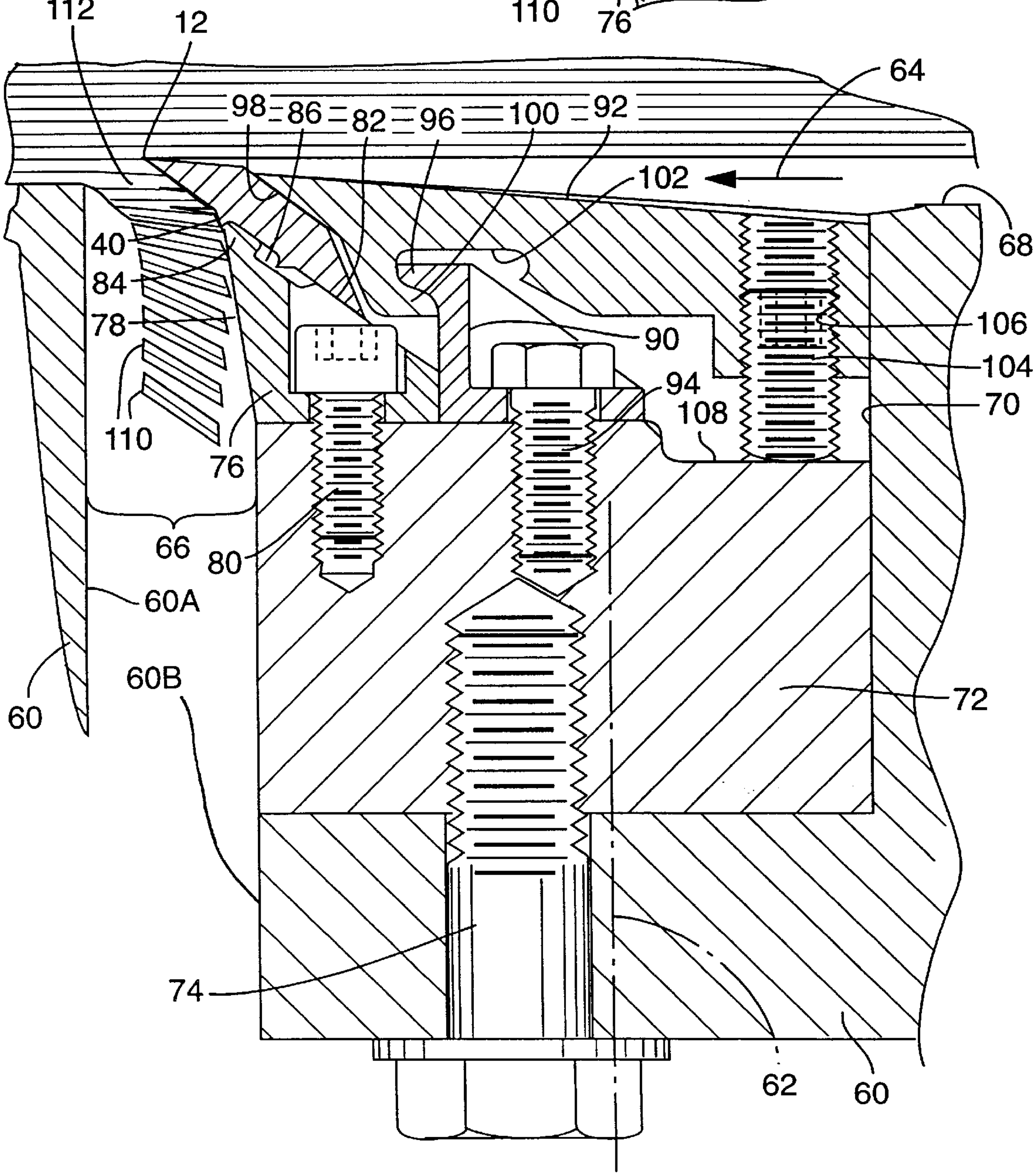
FIG. 5 is a sectional view through portions of a disc provided in a chip-cutting machine, showing how the knife may be clamped in position on the machine with provision made for varying the type of knife that is employed in the chip cutting.

A knife having the construction like the one discussed, may be mounted in a chip-cutting apparatus as illustrated in FIG. 5. Illustrated in this figure are portions 60A, 60B of a chip-cutting disc 60. During operation of the apparatus, the disc is rotated about a central axis oriented as is axis 62, so that the portions of the disc illustrated in FIG. 5 move in a circular sweep generally in the direction indicated by arrow 64. An opening 66 separates leading and trailing portions 60A, 60B of the cutting disc, with this opening accommodating the passage therethrough of chip material cut by the disc.

Face 68 of the disc adjacent opening 66 is provided with a recess 70 which receives what is referred to herein as a mounting base 72. The mounting base is secured in place within the recess as with fasteners, one of which is illustrated at 74.

Detachably mounted to the top of mounting base 72 directly adjacent opening 66, is a counterknife 76 surfaced by a chip guide surface 78 which faces opening 66. The counterknife is secured in place by multiple fasteners, one of which is shown at 80.

The counterknife is provided along its top with a sloping mounting surface 82. Mounting surface 82 joins with guide surface 78 at a toe region 84. Paralleling this toe region but spaced rearwardly therefrom, and indented into the counterknife from mounting surface 82, is a shallow groove 86. The top of toe region 84 provides a key fitting within channel 52 on the front side of the knife.

The knife illustrated in FIGS. 1 and 2 may be mounted in the structure described with one of its cutting edge (edge 12 in FIG. 5) exposed above opening 66. When mounting the knife, its front side is placed against mounting surface 82 and the pressure-applying surface is placed against toe 84. Deflector portion 40 associated with cutting edge 12 fits against the front of toe 84. The other deflector portion (which is the one closer to cutting edge 14) lodges in channel 86.

Indicated at 90 is a bracket member used for providing pivotal support for a clamp or cover member 92 disposed thereover. The bracket member is an elongate member substantially paralleling counterknife 76 and is secured to the mounting base with multiple fasteners disposed in a row along the bracket member with such fasteners exemplified by fastener 94. A hook flange 96 which is an integral part of the bracket member projects forwardly of the bracket member along its forward extremity. Alternatively, the bracket member may be formed as an integral part of base 72.

Clamp or cover member 92 at its forward extremity has a clamping surface 98. With the parts assembled as in FIG. 5, this clamping surface presses against the clamp-facing surface portion in the knife. Rearwardly of this clamping surface, the bracket member has a shoulder flange 100 disposed below an elongate recess 102 provided on the underside of the clamp member. The shoulder flange fits under and cooperatively engages with hook flange 96.

Multiple screws, as exemplified by screw 104, are received within threaded bores as exemplified by bore 106 provided along the rear margin of the clamp or cover member. Bottom ends of these screws bear against a surface 108 adjacent the rear of mounting base 72.

With the construction described, with extension of screws 104 from the clamp or cover member, the member is caused to pivot in a counterclockwise direction about the pivot mounting provided by the hook flange and shoulder flange 100. This is accompanied with movement of clamping surface 98 forceably against the knife to firmly clamp the knife in place.

With the knife mounted in a chip-cutting machine as illustrated in FIG. 5, with the cutting edge of the knife moving across the grain of the wood cut, chips such as those shown at 110 are produced from the lip of wood material 112 which is cut and then deflected away from the remainder of the wood being cut, due to the wedging action produced by the divergence of the front and back knife-edge-joining surface portions. On this lip of material moving against deflector portion 40, the material is caused to break apart, in breaks extending along the grain, to form chips 110. The chips produced have a length which is related to the extent that the cutting edge is carried above trailing portion 60B of the disc, and a width which is related to the distance between the cutting edge in the knife and the front of the deflector portion which is to the rear of the knife.

Figure 3:
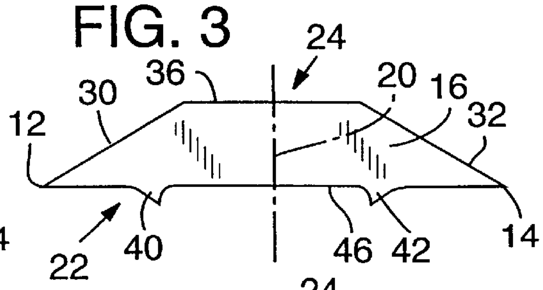
FIGS. 3 and 4 are end views of modified forms of knives incorporating different deflector portions in the knives.
Figure 4:
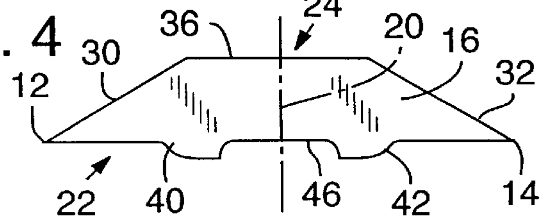
Figure 6:
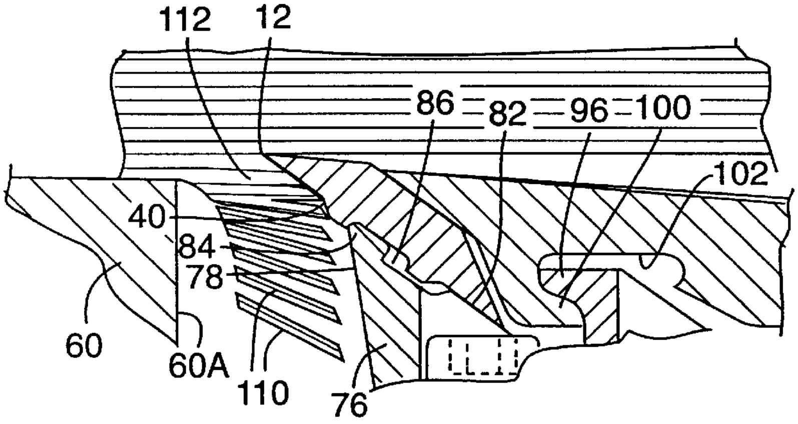
FIG. 6 is similar to portions of FIG. 5, but showing a different type of knife clamped in position in the machine, and illustrating how such produces a different type of chip.

FIGS. 3 and 4 illustrate different configurations for knives usable in producing differently configured chips. The knife in FIG. 3 has a deflector portion associated with each cutting edge which is closer to the cutting edge than the knife illustrated in FIG. 1. With use of such a knife, chips of slightly less length are produced (with all other things being equal, i.e., speed of rotation of the cutting disc, advancing speed of the log, and wood specie involved), and chips of slightly thinner dimension result (by reason of the lip of wood which is being cut engaging a deflector portion which is closer to the cutting edge of the knife). The knife shown in FIG. 4 has deflector portions of greater width than those of FIGS. 2 and 3. A knife of this description cuts chips of the same length as the knife shown in FIG. 2, but chips of lesser thickness (all other things being equal). FIG. 5 shows the knife of FIG. 4 mounted in chip-cutting apparatus.

As earlier discussed, the knives illustrated have two cutting edges, and are symmetrical about a mid plane. As a consequence, after one cutting edge is dulled, a replacement edge may be provided merely by removing the knife and turning the knife end-to-end to place its opposite cutting edge 14 in an exposed position, with the knife's other deflector portion 42 now being the deflector portion which serves to produce chip fragmentation.

In the production of chips, it should be obvious that a zone in the apparatus subjected to appreciable wear caused by material moving thereover is at the front of the knife, where the lip of cut wood is deflected abruptly outwardly, which is to say the zone bounded by the surface of a deflector which faces the cutting edge. This is a surface which is part of the knife itself, rather than a separate wear piece, and this is a surface which is replaced with replacement of a knife. With the knife contemplated being designed as a replaceable item to be replaced after both its edges are worn, the replacement of these wear surfaces at this time is an obvious advantage.

Different mills produce different forms of chips from apparatus running at different speeds and cutting different species of wood. Further, there are variables introduced depending upon whether the wood is wet or dry, or being processed in winter or summer conditions. With the construction of a knife as contemplated, it should be obvious that it is a relatively easy matter to select a knife construction which is directly tailored to produce the type of chip desired for the particular operating conditions existing at the time of selection.

Figure 7:
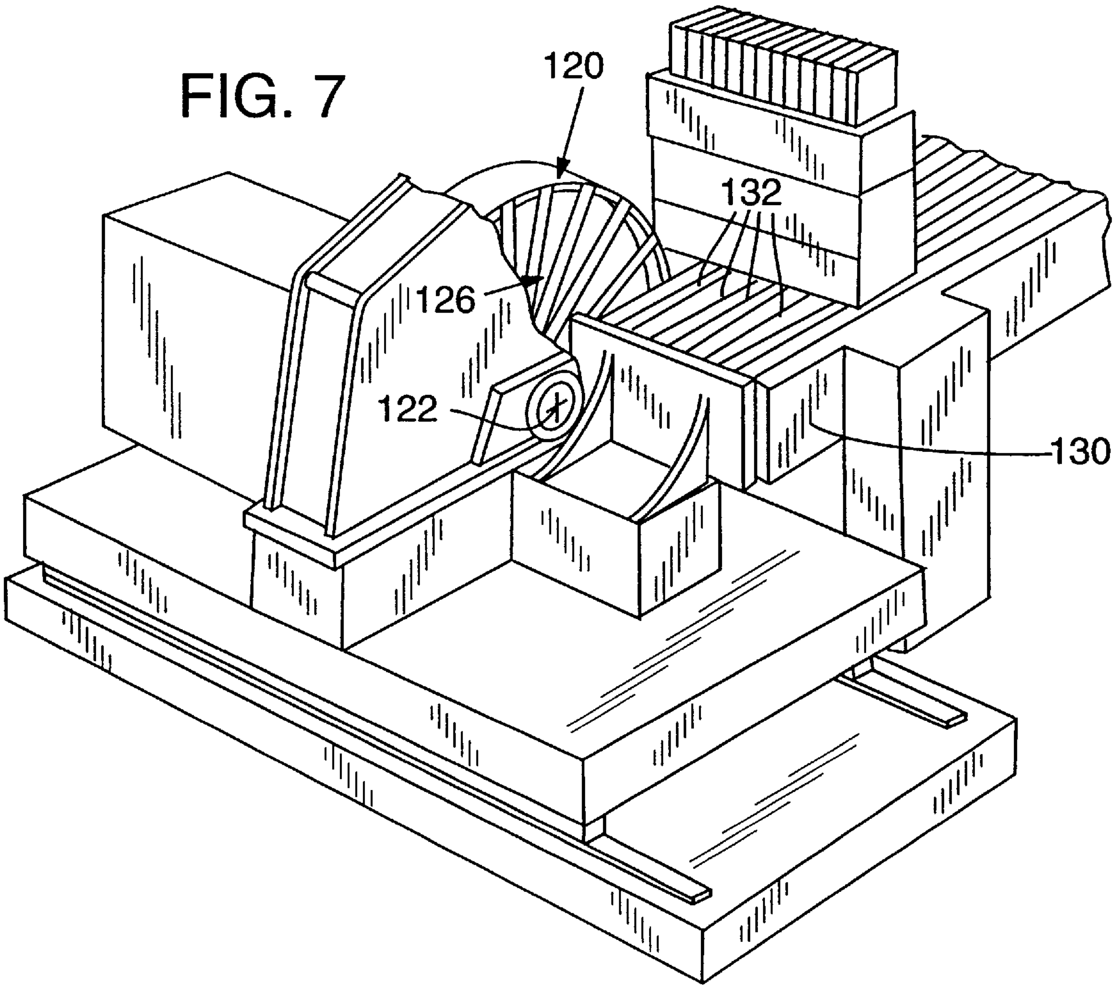
FIG. 7 is a drawing, in simplified form, showing another type of chip-cutting machine, where chips are produced with cuts paralleling the grain of the wood, as when cutting thin chips or wafers.
Figure 8:
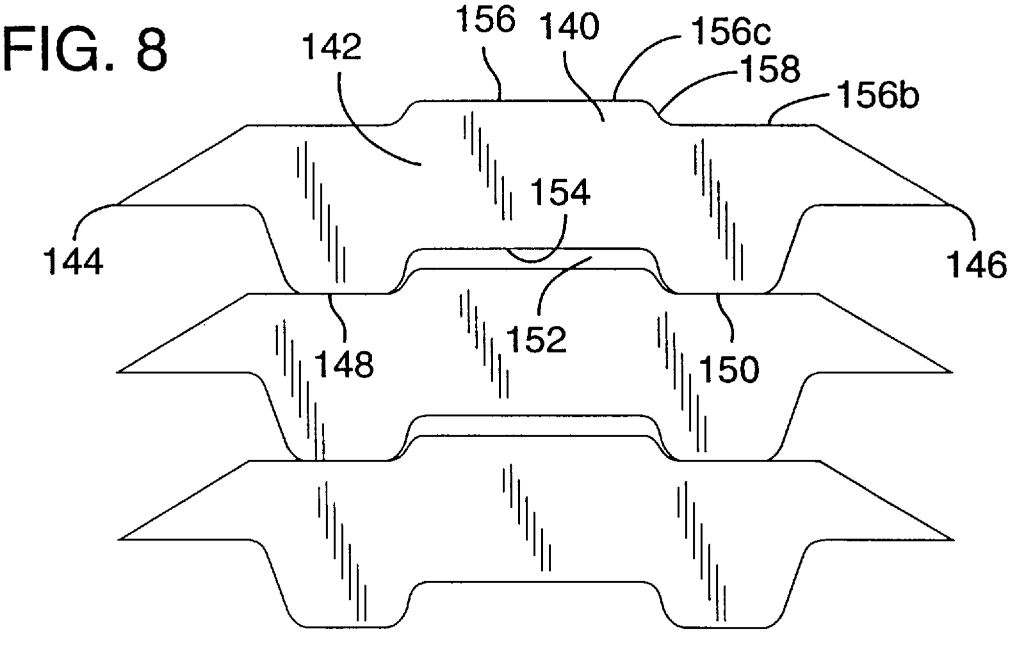
FIG. 8 is an end view of a modified form of knife which promotes stacking of multiple knives with the knives nesting with each other.

Illustrated in FIG. 8 is another type of chip-cutting apparatus. The apparatus illustrated is utilized in producing chips that are relatively thin and that are referred to commonly in the industry as wafers or flakes, with this material being used in the manufacture of oriented strand board or wafer board. In the chip-cutting apparatus of FIG. 7, a power-rotated disc is shown at 120, which like disc 60 earlier described, is rotated when producing cutting, with rotation being about the center axis shown at 122. Distributed about the axis of the disc, and extending radially on the disc, are elongate knife mountings shown at 126. These knife mountings mount knives of the type herein described with one of the cutting edges in a particular knife mounted in an exposed position for producing a cut.

With the flaker illustrated, the wood material being cut is held in a bin 130 and is exemplified by the logs shown at 132. The logs have grain extending generally parallel to the cutting plane of the knives. In this type of chip cutter, the width of the chip or flake being cut is dependent on the distance of a deflector portion from its associated cutting edge in the knife blade doing the cutting.

Illustrated in FIG. 8 is another modification of knife. The knife shown at 140 includes a body 142 with knife edges 144, 146 as opposite margins. Deflector portions 148, 150 are shown on the front side of the knife, with these deflector portions bounding a space 152. This space is also bounded by pressure-applying surface 154.

In the knife of FIG. 8 the clamp-facing surface portion 156 is stepped and occupies two levels. These levels include a central level 156*c* which forms the outer part of a ridge 158 extending the length of the knife. The two levels in addition include marginal levels 156*b* which are the levels extending into the back knife-edge-joining surface portions in the knife.

With the knife illustrated, stacking of multiple knives is possible. When stacked, the ridge of one of a pair of nesting knives nests within space 152 located between the deflector portions of the other knife in the pair. This nesting feature is obviously important in transporting knives from one location to another, and in promoting mechanical handling.

Various modifications and variations of the invention have been described herein. It is intended to embrace all modifications and variations coming within the coverage of the appended claims.

It is claimed and desired to secure by Letters Patent:

1. A chip-cutting knife comprising an elongate body with opposite margins and a pair of opposed cutting edges, with one cutting edge extending along one margin of the body and another cutting edge extending along the opposite margin, said body being generally symmetrical in regions disposed on opposite sides of a mid plane bisecting said body between said opposed margins, said body having a front side and a back side, and a pair of elongate deflector portions protruding from the front side of the body with said deflector portions being spaced equal distances from and parallel to said mid plane, said deflector portions being separated by an elongate channel disposed therebetween along said mid plane, the back side of said body including a clamp-facing surface portion bisected by said mid plane and a back knife-edge-joining surface portion extending from each knife edge, said knife-edge-joining surface portions meeting with the clamp-facing surface portion and forming obtuse angles with the clamp-facing surface portion, the bottom of the elongate channel forming a pressure-applying surface portion extending between said deflector portions and spaced laterally from the clamp-facing surface portion.

2. The chip-cutting knife of claim 1, wherein said pressure-applying surface portion and said clamp-facing surface portion are substantially perpendicular to said mid plane where bisected by said mid plane.

3. The chip-cutting knife of claim 1, wherein the clamp-facing surface portion is stepped and occupies two levels including a central level which forms the outer part of a ridge extending the length of the knife body, the construction enabling a pair of like chip-cutting knives to be stackable with the ridge of one of the pair nesting between the deflector portions of the other of the pair.

4. The chip-cutting knife of claim 2, wherein said cutting edges occupy a common cutting-edge plane, said cutting-edge plane and said pressure-applying surface portion are both spaced in the same direction from said clamp-facing surface portion, with the spacing of the pressure-applying surface portion from the clamp-facing surface portion being no less than the spacing of said cutting-edge plane.

5. The chip-cutting knife of claim 1, wherein said body further has a front knife-edge-joining surface portion on the underside of the body extending from each knife edge toward said mid plane, and each front knife-edge-joining surface portion together with a back knife-edge-joining surface portion bound a marginal region in the knife, said pressure-applying surface portion and said clamp-facing surface portion bounding a central region in the knife body with this central region throughout its extent having a thickness equaling or exceeding the thickness of the marginal regions of the knife body throughout the extent of the marginal regions.

6. The knife of claim 5, wherein said front knife-edge-joining surface portions occupy substantially a common plane.

7. A chip-cutting knife comprising an elongate body with opposite margins and a pair of opposed cutting edges with one cutting edge extending along one margin of the body and the other cutting edge extending along the opposite margin of the body, said body being symmetrical in regions disposed on opposite sides of a mid plane bisecting the knife body, said body having a front side and a back side, and a pair of elongate spaced-apart deflector ribs protruding from the front side of the body, said deflector ribs being spaced equal distances from said mid plane and separated by a channel, the back side of said body including a substantially flat clamp-facing surface portion bisected by said mid plane and the front side of said body having a substantially flat pressure-applying surface portion spaced laterally from and substantially paralleling the clamp-facing surface portion extending between said deflector ribs and bisected by said mid plane, said body further having a front knife-edge-joining surface portion on the front side of the body extending from each knife edge toward said mid plane, the front knife-edge-joining surface portions of said body being spaced laterally from said clamp-facing surface portion and this lateral spacing being no greater than the lateral spacing of said pressure-applying surface portion from said clamp-facing surface portion.

8. The knife of claim 7, wherein said front knife-edge-joining surface portions occupy substantially a common plane.

* * * * *